US005472616A

United States Patent [19]

Szmanda et al.

[11] Patent Number: 5,472,616

[45] Date of Patent: Dec. 5, 1995

[54] MODIFIED ANION EXCHANGE PROCESS

[75] Inventors: Charles R. Szmanda, Westborough; Richard J. Carey, Sherborn, both of Mass.

[73] Assignee: Shipley Company, Inc., Marlborough, Mass.

[21] Appl. No.: 143,489

[22] Filed: Oct. 27, 1993

[51] Int. Cl.⁶ ...................................................... B01J 41/08
[52] U.S. Cl. ................................................................ 210/683
[58] Field of Search ..................................... 210/674, 683

[56] References Cited

U.S. PATENT DOCUMENTS 3,471,553  10/1969  Bittner ..................................... 260/519
4,540,493  9/1985  Dickerson et al. ..................... 210/674
4,737,487  4/1988  Watts et al. .............................. 514/15

FOREIGN PATENT DOCUMENTS 1228560  9/1989  Japan .
93/12152  6/1993  WIPO .

Primary Examiner—Ivars Cintins
Attorney, Agent, or Firm—Robert L. Goldberg

[57] ABSTRACT

The invention is for a process of removing anions from an organic solution, especially one having base labile components. The process comprises modifying an anion exchange resin by treatment with a solution of a source of anions less basic than the hydroxyl anion and contacting said modified ion exchange resin with an organic solution containing anions. The process is especially useful for treating photoresist compositions.

17 Claims, No Drawings

MODIFIED ANION EXCHANGE PROCESS

BACKGROUND OF THE INVENTION

1. Introduction

This invention relates to removal of contaminants from organic solutions. In a preferred embodiment, this invention relates to removal of anions such as halide ions from photoresist compositions.

2. Description of the Prior Art

Photoresists are light-sensitive compositions used for the formation of images in the manufacture of electronic devices. Photoresist coating compositions typically comprise a light-sensitive component and a polymer binder dissolved in a solvent. Typical photoresist compositions are disclosed in U.S. Pat. Nos. 5,178,986; 5,212,046; 5,216,111; and 5,238,776, each incorporated herein by reference for disclosure of photoresist compositions, processing, and use.

In the manufacture of high resolution integrated circuits, it is known that many processing liquids come into contact with a bare wafer or a resist coated surface. These include the resist itself and treatment chemicals such as organic liquids and aqueous solutions which contain acids, bases, oxidants, and other proprietary ingredients. At least 15 to 50 liquids of various compositions are used to clean wafers, prime surfaces, deposit resists or other polymers, develop, rinse, etch, and strip the resist. It is known that these solutions are a source of contaminants that can interfere with the performance of the integrated circuit. Thus, the reduction or removal of insoluble and soluble contaminants from processing fluids used for the production of integrated circuits before or during use is basic insurance for prevention of damage to the integrated circuit.

Photoresist liquids are known to contain particulate and ionic contaminants. For example, it is known that solid gels or insolubles form in photoresists due to dark reactions. In addition, soluble impurities such as moisture, silicone oils, plasticizers, and metal ions may be present from the manufacture of the resist components and from the packaging containers or dispensing tanks. Trapped bubbles from point-of-use filtration or the shaking of a resist bottle prior to dispensing can lead to defects in resist coatings. In Class 100 clean rooms, airborne particulate counts amount to 3 particles per liter of density of 2. By comparison, liquids contain about 100,000 particles per liter. A particle count of 100,000 per liter seems high, but if translated into a solid of $0.6\mu$ in size (entity of 2), this is equivalent to 10 parts per million (ppm). A level of 10 ppm amounts to the deposition of 10 mg per liter. Since liquids are heavily contaminated compared to clean room air, effective contaminant removal is essential to the manufacture of such devices.

Ultrafiltration of resist liquids has progressed and manufacturers of resist now supply resist materials filtered through 0.04 $\mu$M diameter absolute filters. Other methods for removal of particulates such as gels include ultracentrifugation, electrostatic treatment of the resist, and depth filtration. These methods are useful for the removal of particulates but are not effective in removing dissolved contaminants such as organic impurities and ionic species. These contaminants can be as damaging to an integrated circuit as particulate contamination.

Dissolved contaminants in resists such as metal ions, organic contaminants and halide ions require more sophisticated detection and removal methods than the methods used to remove particulates. One such method is disclosed in International Publication No. WO 93/12152 which is directed to removing metal ions such as sodium and iron from novolak resins during manufacture. The process comprises cation exchange treatment whereby a cation exchange resin is first washed with a mineral acid solution to reduce the level of total sodium and iron ions within the exchange resin to preferably less than 100 ppb, passing a formaldehyde reactant through the so treated cation exchange resin to decrease the sodium and iron ion content to less than 40 ppb, passing a phenolic compound through the cation exchange resin to decrease its sodium and iron ion content to less than 30 ppb, and then condensing the so treated phenolic compound with formaldehyde in the presence of an acid catalyst to form the resin. This method of removal is cumbersome, does not remove contaminants from other photoresist components and does not remove the ionic species from the photoresist that enters between the time of manufacture of the phenolic and the use of the photoresist.

A method for removal of organic contaminants together with chelated multivalent metal ions is disclosed in copending U.S. patent application Ser. No. (Attorney Docket No. 42602), filed Oct. 20, 1993, assigned to the same assignee as the subject application and incorporated herein by reference. In accordance with the procedures of said copending application, multivalent metal ions are first chelated with a chelating agent for the metal ions, preferably a chelating agent that is an organic impurity in the photoresist formulation such as an azo or diazo dye. The solution of the photoresist containing the chelated, multivalent metal ion is then contacted with a pure activated carbon which selectively removes organic contaminants from the solution of the photoresist including the organic contaminants chelated with the multivalent metal ions.

A method for removal of ionic metals from a photoresist is disclosed in published Japanese patent application No. 1228560 published Sep. 12, 1989, incorporated herein by reference. In accordance with the procedures of this patent, a photosensitive resin is passed through a mixed bed of a cation exchange resin and an anion exchange resin. Though the process of the reference does remove the contaminates as described therein, it has been found that the acid proton or the cation exchange resin may attack acid labile components of a photoresist, such as solvents and resins conventionally used in photoresist compositions with the formation of undesired by-products. It has also been found that the strong base of the anion exchange resin may attack base labile materials such as o-quinonediazide photoactive components of a photoresist with the formation of undesired by-products. Consequently, though the process of the reference removes ionic metals, the procedure introduces other undesirable by-products into the photoresist formulation.

In copending U.S. patent application Ser. No. 08/128,994, filed Sep. 30, 1993, assigned to the same assignee as the subject application and incorporated herein by reference, a process is disclosed for removing metallic ions from organic solutions using modified cation exchange resins. In accordance with the process of the invention disclosed therein, the cation exchange resin is modified by replacement of the acid protons on the cation exchange groups with essentially neutral groups such as ammonium or amine groups. Thereafter, an organic solution containing acid labile components may be treated with the modified cation exchange resin to remove metal ions without the formation of undesired by-products caused by attack of acid protons on acid labile groups.

SUMMARY OF THE INVENTION

In accordance with the invention, modified anion exchange resins are used to remove anionic contaminants from organic solution containing base labile components without formation of undesired by-products. The invention is in part based upon the unexpected discovery that the reactions of base labile materials with anion exchange groups are inhibited or prevented when the anion exchange resin used has strong basic groups, i.e., hydroxyl groups, replaced by weak acid anions prior to use, such resins being referred to herein as modified anion exchange resins. Accordingly, the procedure of the invention comprises removal of anionic contaminants from organic solutions comprising base labile materials by contact of the solution with a modified anion exchange resin, preferably an anion exchange resin treated with a solution containing an ionizable source of weak acid ions, such as an organic acid, prior to contact with the organic solution.

It is an unexpected discovery of the invention that anionic contaminants are removed using the modified anion exchange resins of the invention without attack on base labile groups.

DESCRIPTION OF THE PREFERRED EMBODIMENTS

Though the process of the invention is suitable for removal of anionic contaminants from essentially any organic solvent or solution, the invention is especially suitable for removal of such contaminants from photoresist solutions and the description that follows will be directed to photoresist compositions for purposes of illustration, but not by way of limitation.

A photoresist is an organic coating formed from a solution of a film-forming resin and a light-sensitive component that undergoes chemical change upon exposure to patterned activating radiation to form areas of differential solubility within the coating. Typical photoresist compositions are disclosed in U.S. Pat. Nos. 5,178,986; 5,212,046; 5,216,111; and 5,238,776, each incorporated herein by reference for disclosure of photoresist compositions, processing, and use.

All photoresists used for the formation of integrated circuits contain a low concentration of anionic contaminants such as halides, phosphates, nitrates, borates, and other materials that could function as a dopant in an integrated circuit. These contaminants are present as a consequence of the method of manufacture and from contaminants from container materials used to package the photoresist. It is known to remove anionic impurities from solution with anion exchange resins having strongly basic exchange groups. However, many of the components of photoresists used for integrated circuit manufacture contain base labile groups that are subject to attack by strong anion exchange materials. For example, typical photoresist solvents containing base labile groups include esters, ethers and diketones. Typical resins used in photoresist compositions containing base labile groups include epoxies, polyamides, and polysiloxanes. Typical photoactive components used in photoresist compositions containing base labile groups include conventional photoactive compounds such as 2,1,4-diazonaphthoquinone sulfonate esters, 2,1,5-diazonaphthoquinone sulfonate esters and 2,1,6-diazonaphthoquinone sulfonate esters.

Other materials used in photoresist compositions or otherwise in integrated circuit manufacture that possess base labile groups or chromophore groups affected by strong bases include additives such as epoxy compounds, vinyl ethers, compounds containing triaryl methyl groups, spin-on glass formulations, compounds containing Si-N bonds, Si-halogen bonds, C-P bonds, C-halogen bonds, siloxanes, etc.

In accordance with the invention, any component of the photoresist composition may be treated to remove anionic contaminants by contact of the component with the modified anion exchange resin. The invention is especially suitable for treating quinonediazide photoactive components used in the formulation of a photoresist composition. However, any one or more of the remaining components of the photoresist may be treated by dissolving the same in the photoresist solvent and contacting the solution so formed with the modified anion exchange resin.

Any anion exchange material used to remove contaminants from an organic solution in the prior art may be treated in accordance with the procedures of the invention. Suitable anion exchange materials are disclosed in the aforesaid published Japanese application and in Samuelson, *Ion Exchange Separations in Analytical Chemistry*, John Wiley and Sons, New York, 1963, Chapter 2, incorporated herein by reference. Preferred anion exchange resins are resins having structurally bound quaternary ammonium hydroxide exchange groups such as polystyrene-divinylbenzene resins substituted with tetramethyl ammonium hydroxide. The most preferred anion exchange resin is crosslinked polystyrene having quaternary ammonium hydroxide substitution such as those ion exchange resins sold under the tradenames Amberlyst A26-0H by Rohm and Haas Company and Dow G51-0H by Dow Chemical Company. The modified anion exchange resins should be essentially free of anionic contaminants, especially halide ions, to avoid introduction of such contaminant ions into the photoresist rather than removal of the same.

The anion exchange resins are modified in accordance with the invention by treating the same with a solution of a source of an anion less basic than the hydroxyl anion, such as an organic acid free of halide groups. The term less basic than the hydroxyl anion means that the basicity of the anion should be less than that which would deleteriously effect a base labile group to be heated with the ion exchange resin. Typical organic acids include low molecular weight carboxylic acids such as formic acid, acetic acid, citric acid, carbonic acid, propionic acid, butyric acid, and lactic acid. More preferred are the polyfunctional acids which have additional polar groups such as carboxyl, hydroxyl, oxo, or ester groups. Such acids include dicarboxylic acids such as malonic acid and succinic acid.

The anion exchange resin may be modified by slurrying the resin with the organic acid for a time varying between about 1 and 30 hours, more preferably, from about 4 to 10 hours. The concentration of the organic acid may vary between about 1 and 10 percent by weight, but preferably varies between about 3 and 6 percent by weight. Higher concentrations of the acid can rupture the ion exchange beads. Thereafter, the resin is washed with water until a pH of about 7.0 to 7.8 is reached. Finally, the treated resin is preferably dehydrated by washing the resin with an aqueous miscible organic solvent such as ethyl lactate or acetone. The procedure can be performed at room or elevated temperature though elevated temperatures result in increased exchange efficiency, but with possible concomitant degradation of temperature sensitive materials.

Organic solutions are treated with the modified anion exchange resins by slurrying the same with the resin or by passing the solution through a column of a modified anion exchange resin. The rate of passage of the solution through the column can vary between about 2 and 20 bed volumes per hour. Ambient conditions are suitable.

Though not wishing to be bound by theory, it is believed that by-product formation is reduced or eliminated by the process of the invention by replacing the strongly basic —OH group on the anion exchange resin with an essentially weak acid anion such as acetate or any of the anions of any of the acids identified above. Accordingly, an essentially weak acid is available for exchange with the anionic contaminant rather than the —OH group as in the prior art thus reducing the effect of the strong base on the base labile groups.

EXAMPLE 1

One hundred grams of a quaternary ammonium anion resin were slurried in a 10% acetic acid solution for 4 hours. The resin was then washed with 8 to 10 bed volumes of deionized water to a pH of 7. It was then dehydrated by rinsing several times with acetone. The resin was then packed into a column. Five grams of a diazonaphthoquinone diazide photoactive compound consisting of mixed esters formed by the reaction of 2,1,5-diazonaphthoquinone diazide sulfonic acid and trihydroxybenzophenone (THBP) was dissolved in 100 ml of acetone and the solution passed over a column. Chloride levels dropped from 20 ppm to less than 1 ppm (the detection limit of the test).

EXAMPLE 2

Ten ppm of potassium chloride were added to a 100 gram sample of S1400® photoresist (available from Shipley Company Inc. of Marlborough, Mass. and comprising a 1,2-diazonaphthoquinone diazide sulfonic acid and novolak resin in a solvent). The resulting solution was passed over a column prepared in the manner of Example 1. Chloride levels were less than the detection limit 1.0 ppm in the resulting solution.

EXAMPLE 3

Hexamethyldisilizane was passed over a column prepared in the manner of Example 1. Starting chloride levels were 200 ppb. After treatment, the levels dropped to less than 10 ppb (the detection limit of the test method).

We claim:

1. A process for removing anionic contaminants from an organic solution containing a base labile solute, said process comprising the steps of contacting said organic solution with an anion exchange resin that has had strong basic groups displaced by weaker anions having a basicity less than that of the hydroxyl anion, the contact between the organic solution and the modified anion exchange resin being for a time sufficient to remove essentially all anionic contaminants from solution.

2. The process of claim 1 where the source of the weaker anion is a low molecular weight, halogen free, organic acid.

3. The process of claim 2 where the organic acid is selected from the group consisting of formic acid, acetic acid, carbonic acid, propionic acid, butyric acid, malonic acid, succinic acid, citric acid, and lactic acid.

4. The process of claim 2 where the organic acid is acetic acid.

5. The process of claim 1 where the anions used to replace said strong basic groups in the anion exchange resin are selected from the group consisting of halides, phosphates, nitrates, borates, sulfates and organic sulfonic acids.

6. A process for removing anionic contaminants from an organic solution containing a base labile solute, said process comprising the steps of providing an anion exchange resin treated with an aqueous solution of a weaker anion less basic than the hydroxyl anion for a time sufficient to displace substantially all of the strong basic groups on said exchange resin with said weakly-basic anions and contacting said organic solution with said anion exchange resin for a time sufficient to remove essentially all anionic contaminants from solution.

7. The process of claim 6 including the step of dehydrating the anion exchange resin by contact with an organic solvent between the steps of displacement of the strong basic groups and contact with the organic solution.

8. The process of claim 6 where the source of the weaker anion is a low molecular weight, halogen free, organic acid.

9. The process of claim 8 where the organic acid is selected from the group consisting of formic acid, acetic acid, carbonic acid, propionic acid, butyric acid, malonic acid, citric acid, lactic acid, and succinic acid.

10. The process of claim 8 where the organic acid is acetic acid.

11. The process of claim 6 where the anions used to replace said strong basic groups in the anion exchange resin are selected from the group consisting of halides, phosphates, nitrates, borates, sulfates and organic sulfonic acids.

12. A process for removing anionic contaminants from a base labile organic solution used in the manufacture of integrated circuits, said process comprising the steps of contacting said organic solution with an anion exchange resin that has had strong basic groups displaced by contact with a source of weaker anions that are less basic than hydroxyl anions, the contact between the organic solution and the anion exchange resin being for a time sufficient to remove essentially all anionic contaminants from said solution.

13. The process of claim 12 where the source of the weaker anion is a low molecular weight, halogen free, organic acid selected from the group consisting of formic acid, acetic acid, carbonic acid, propionic acid, butyric acid, oxalic acid, lactic acid, citric acid, and succinic acid.

14. The process of claim 13 where the organic acid is acetic acid.

15. The process of claim 12 where the anions used to replace said strong basic groups in the anion exchange resin are selected from the group consisting of halides, phosphates, nitrates, borates, sulfates and organic sulfonic acids.

16. The process of claim 12 where the organic solution contains an o-quinone diazide sulfonic acid ester.

17. The process of claim 12 where the organic solution is a photoresist solution.

* * * * *